US009124642B2

(12) United States Patent
Choudhury et al.

(10) Patent No.: US 9,124,642 B2
(45) Date of Patent: Sep. 1, 2015

(54) ADAPTIVELY STREAMING MULTIMEDIA

(75) Inventors: Sayeed Zaman Choudhury, New York, NY (US); Rajiv K. Vijayakumar, San Diego, CA (US); Idreas Mir, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 259 days.

(21) Appl. No.: 12/903,491

(22) Filed: Oct. 13, 2010

(65) Prior Publication Data

US 2011/0093605 A1    Apr. 21, 2011

Related U.S. Application Data

(60) Provisional application No. 61/252,621, filed on Oct. 16, 2009.

(51) Int. Cl.
| | | |
|---|---|---|
| *G06F 15/16* | (2006.01) | |
| *H04L 29/08* | (2006.01) | |
| *H04L 29/06* | (2006.01) | |

(52) U.S. Cl.
CPC ............ *H04L 67/22* (2013.01); *H04L 65/1059* (2013.01); *H04L 65/4084* (2013.01); *H04L 65/4092* (2013.01); *H04L 65/602* (2013.01); *H04L 65/80* (2013.01); *H04L 67/303* (2013.01)

(58) Field of Classification Search
CPC .............. H04L 65/4084; H04L 65/602; H04L 65/1059; H04L 65/80; H04L 67/303; G06F 15/16
USPC .............. 709/219, 231, 213; 700/83; 379/114
See application file for complete search history.

(56) References Cited

U.S. PATENT DOCUMENTS

| | | | | |
|---|---|---|---|---|
| 6,400,996 | B1 * | 6/2002 | Hoffberg et al. | 700/83 |
| 7,006,881 | B1 * | 2/2006 | Hoffberg et al. | 700/83 |
| 7,051,275 | B2 * | 5/2006 | Gupta et al. | 715/201 |
| 7,085,843 | B2 * | 8/2006 | Buddhikot et al. | 709/231 |
| 7,788,446 | B2 * | 8/2010 | Kurtas et al. | 711/111 |
| 7,873,708 | B2 * | 1/2011 | Durand et al. | 709/219 |
| 2001/0045962 | A1 * | 11/2001 | Lee et al. | 345/745 |

(Continued)

FOREIGN PATENT DOCUMENTS

| | | |
|---|---|---|
| CN | 1866810 A | 11/2006 |
| CN | 101283351 A | 10/2008 |

(Continued)

OTHER PUBLICATIONS

International Search Report and Written Opinion—PCT/US2010/052943, International Search Authority—European Patent Office—Feb. 24, 2011.

(Continued)

*Primary Examiner* — Tesfay Yohannes
(74) *Attorney, Agent, or Firm* — Brent A. Boyd

(57) ABSTRACT

A method, system, and computer program for adaptively streaming multimedia content is disclosed. An adaptive stream manager monitors at least one parameter of a user terminal. The adaptive stream manager monitors at least one parameter of the user terminal and predicting a future value of at least one parameter of the user terminal. The adaptive stream manager also selects a target characteristic, based on the predicted future value of the at least one parameter of the user terminal, and requests a multimedia segment having the target characteristic from a media server.

18 Claims, 7 Drawing Sheets

(56) References Cited

U.S. PATENT DOCUMENTS

| | | | |
|---|---|---|---|
| 2002/0013635 | A1* | 1/2002 | Gotou et al. ............... 700/108 |
| 2003/0006911 | A1* | 1/2003 | Smith et al. ................ 340/988 |
| 2003/0233464 | A1* | 12/2003 | Walpole et al. ............ 709/231 |
| 2005/0234922 | A1* | 10/2005 | Parekh et al. ................ 707/10 |
| 2005/0240676 | A1* | 10/2005 | Moon ......................... 709/231 |
| 2005/0246751 | A1 | 11/2005 | Boyce et al. |
| 2006/0168290 | A1 | 7/2006 | Doron |
| 2006/0253685 | A1* | 11/2006 | Wong et al. .................. 712/25 |
| 2007/0019551 | A1* | 1/2007 | Pozhenko et al. .......... 370/235 |
| 2007/0091815 | A1 | 4/2007 | Tinnakornsrisuphap et al. |
| 2007/0091920 | A1 | 4/2007 | Harris et al. |
| 2007/0150592 | A1 | 6/2007 | Bell |
| 2007/0299936 | A1* | 12/2007 | Borgendale et al. ........ 709/219 |
| 2008/0151405 | A1* | 6/2008 | Kurtas et al. ................. 360/31 |
| 2008/0172747 | A1 | 7/2008 | Hurtado et al. |
| 2008/0181179 | A1* | 7/2008 | Karaoguz .................... 370/331 |
| 2008/0215746 | A1* | 9/2008 | Agarwal et al. ............. 709/231 |
| 2008/0270532 | A1 | 10/2008 | Billmaier et al. |
| 2008/0310446 | A1 | 12/2008 | Bellwood et al. |
| 2008/0313351 | A1* | 12/2008 | Mobasser .................... 709/241 |
| 2009/0016507 | A1* | 1/2009 | Altberg et al. .......... 379/114.01 |
| 2009/0017860 | A1 | 1/2009 | Cole |
| 2009/0077599 | A1* | 3/2009 | Appelquist et al. ........... 725/93 |
| 2009/0094279 | A1 | 4/2009 | Carmeli et al. |
| 2009/0124241 | A1* | 5/2009 | Krishnaswamy et al. . 455/414.2 |
| 2009/0125321 | A1* | 5/2009 | Charlebois et al. ............. 705/1 |
| 2009/0157513 | A1* | 6/2009 | Bonev et al. .................... 705/14 |
| 2009/0216897 | A1 | 8/2009 | Wang |
| 2009/0279547 | A1 | 11/2009 | Mistry |
| 2009/0313299 | A1* | 12/2009 | Bonev et al. .............. 707/103 R |
| 2010/0021138 | A1* | 1/2010 | Perrault et al. ................ 386/95 |
| 2010/0070644 | A1* | 3/2010 | Lim et al. .................... 709/231 |
| 2010/0115472 | A1* | 5/2010 | Lee et al. ..................... 715/854 |
| 2010/0121709 | A1 | 5/2010 | Berezin et al. |
| 2010/0306810 | A1 | 12/2010 | Brooks et al. |
| 2011/0106969 | A1 | 5/2011 | Choudhury et al. |
| 2011/0119587 | A1 | 5/2011 | Joy et al. |
| 2011/0151839 | A1* | 6/2011 | Bolon et al. ............... 455/414.1 |
| 2011/0164689 | A1 | 7/2011 | De Neve et al. |
| 2011/0178610 | A1* | 7/2011 | O'Connor et al. ............. 700/30 |
| 2011/0216832 | A1 | 9/2011 | Wang |
| 2011/0225417 | A1* | 9/2011 | Maharajh et al. ............ 713/150 |
| 2011/0239078 | A1 | 9/2011 | Luby et al. |
| 2011/0239276 | A1* | 9/2011 | Garcia Garcia et al. .......... 726/4 |
| 2012/0045054 | A1* | 2/2012 | Main et al. ................... 380/252 |
| 2012/0208512 | A1 | 8/2012 | Maharajh et al. |
| 2012/0272285 | A1 | 10/2012 | Brooks et al. |

FOREIGN PATENT DOCUMENTS

| | | | |
|---|---|---|---|
| CN | 100478840 | C | 4/2009 |
| CN | 101523369 | A | 9/2009 |
| EP | 1936879 | A1 | 6/2008 |
| EP | 1965564 | A1 | 9/2008 |
| JP | 2003179893 | A | 6/2003 |
| JP | 2004153610 | A | 5/2004 |
| JP | 2004159318 | A | 6/2004 |
| JP | 2005151352 | A | 6/2005 |
| JP | 2005267218 | A | 9/2005 |
| JP | 2006500808 | A | 1/2006 |
| JP | 2006041770 | A | 2/2006 |
| JP | 2007158685 | A | 6/2007 |
| JP | 2007528087 | A | 10/2007 |
| JP | 2009037320 | A | 2/2009 |
| JP | 2011504036 | A | 1/2011 |
| WO | 2004028095 | A1 | 4/2004 |
| WO | WO2005069108 | A1 | 7/2005 |
| WO | 2006012911 | | 2/2006 |
| WO | WO2007047031 | A2 | 4/2007 |
| WO | WO2009009166 | A1 | 1/2009 |
| WO | WO2009064066 | A1 | 5/2009 |

OTHER PUBLICATIONS

Search Authority—European Patent Office—Feb. 24, 2011.
Os, Ed. et al, HTTP Live Streaming, http://tools.ietf.org/html/draft-pantos-http-live-streaming-04, Oct. 4, 2010.
Serif, Tacha. et al, Integrating Perceptual, Device and Location Characteristics for Wireless Multimedia Transmission, 2007 22nd International Symposium on Wireless Pervasive Computing, pp. 511-514, vol. 1-2 (2007).
3rd Generation Partnership Project; Technical Specification Group Services and System Aspects Transparent end-to-end Packet-switched Streaming Service (PSS); Progressive Download and Dynamic Adaptive Streaming over HTTP (3GP-DASH) (Release 10), Technical Specification, V1.0.0 (Sep. 2010).
Alex Zambelli,"IIS Smooth Streaming Technical Overview", Microsoft Mar. 25, 2009, XP002620446, Retrieved from the Internet: URL:http://www.microsoft.com/downloads/en/ details. aspx"FamilyID=03d22583-3ed6-44da-8464-b1b4b5ca7520, [retrieved on Jan. 21, 2011].
Claudio Bettini et al.,"Distributed Context Monitoring for the Adaptation of continuous Services",World Wide Web; Internet and Web Information Systems, Kluwer Academic Publishers, DO vol. 10,No. 4,Jun. 28, 2007,pp. 503-528,XP019558067,ISSN:1573-1413, DOI:10.1007/S11280-007-0028-7 pp. 503-511.
International Search Report and Written Opinion—PCT/US2011/049834—ISA/EPO—Dec. 6, 2011.
Lakshman K et al.,"Integrated CPU and network-I/O QoS management in an end system",Computer Communications,Elsevier Science Publishers BV, Amsterdam, NL,vol. 21,No. 4,Apr. 10, 1998,pp. 325-333,XP004115275,ISSN:0140-3664,DOI:10.1016/S0140-3664(97)00166-7 p. 325-328.
Taiwan Search Report—TW099135302—TIPO—Aug. 19, 2013.

* cited by examiner

ADAPTIVELY STREAMING MULTIMEDIA

CROSS-REFERENCE TO RELATED APPLICATION

The present Application for Patent claims priority to Provisional Application No. 61/252,621 entitled "HTTP Streaming Multimedia Adaptive Policy Manager" filed Oct. 16, 2009, which is hereby expressly incorporated by reference herein.

FIELD

The present disclosure generally relates to streaming multimedia content over a network, and more specifically, to adaptive streaming of multimedia content.

BACKGROUND

Wireless communication systems have become an important means by which many people worldwide have come to communicate. A wireless communication system may provide communication for a number of access terminals, such as wireless telephones, each of which may be serviced by an access point.

An access terminal may communicate with one or more access points via transmissions on an uplink and a downlink. The uplink (or reverse link) refers to the communication link from the access terminal to the access point, and the downlink (or forward link) refers to the communication link from the access point to the access terminal.

The resources of a wireless communication system (e.g., bandwidth and transmit power) must often be shared among multiple access terminals. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

Access terminals include electronic devices such as mobile telephone handsets and other mobile devices that may be configured to receive broadcasts of sports, entertainment, or informational multimedia programs. For example, audio and, or video data may be communicated via a broadband broadcast communications link to the electronic devices. As the bandwidth requirements of access terminals increases, a need exists for methods and apparatuses for enhancing a user experience and for effectively and efficiently viewing multimedia on such electronic devices.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description" one will understand how the features of this invention provide advantages over other illumination and/or devices.

In accordance with one aspect, a method of adaptively streaming multimedia content over a network is provided. The method comprises receiving, at a user terminal, a multimedia stream. The multimedia stream comprises a plurality of multimedia segments, and each multimedia segment has at least one multimedia characteristic. The method further comprises monitoring at least one parameter of the user terminal and selecting a target characteristic. The target characteristic is based on the at least one monitored parameter of the user terminal. The method further comprises requesting a multimedia segment having the target characteristic.

In accordance with another aspect, an apparatus capable of adaptively streaming multimedia content over a network is provided. The apparatus comprises a user terminal. The user terminal comprises a receiver configured to receive a multimedia stream. The multimedia stream comprises a plurality of multimedia segments, and each multimedia segment has at least one multimedia characteristic. The user terminal further comprises an adaptive stream manager configured to monitor at least one parameter of the user terminal. The adaptive stream manager is further configured to select a target characteristic based on the at least one monitored parameter of the user terminal. The adaptive stream manager is further configured to request, from a media server, a multimedia segment having the target characteristic.

In accordance with yet another aspect, an apparatus capable of adaptively streaming multimedia content over a network is provided. The apparatus comprises means for receiving, at a user terminal, a multimedia stream. The multimedia stream comprises a plurality of multimedia segments, and each multimedia segment has at least one multimedia characteristic. The apparatus further comprises means for monitoring at least one parameter of the user terminal. The apparatus further comprises means for selecting a target characteristic, based on the at least one monitored parameter of the user terminal. The apparatus further comprises means for requesting a multimedia segment having the target characteristic.

In accordance with yet another aspect, a non-transitory computer readable medium is provided. The non-transitory computer readable medium comprises code capable of causing a computer to receive, at a user terminal, a multimedia stream. The multimedia stream comprises a plurality of multimedia segments, and each multimedia segment has at least one multimedia characteristic. The non-transitory computer readable medium further comprises code capable of causing a computer to monitor at least one parameter of the user terminal. The non-transitory computer readable medium further comprises code capable of causing a computer to select a target characteristic, based on the at least one monitored parameter of the user terminal. The non-transitory computer readable medium further comprises code capable of causing a computer to request, from a media server, a multimedia segment having the target characteristic.

DETAILED DESCRIPTION

Figure 1:
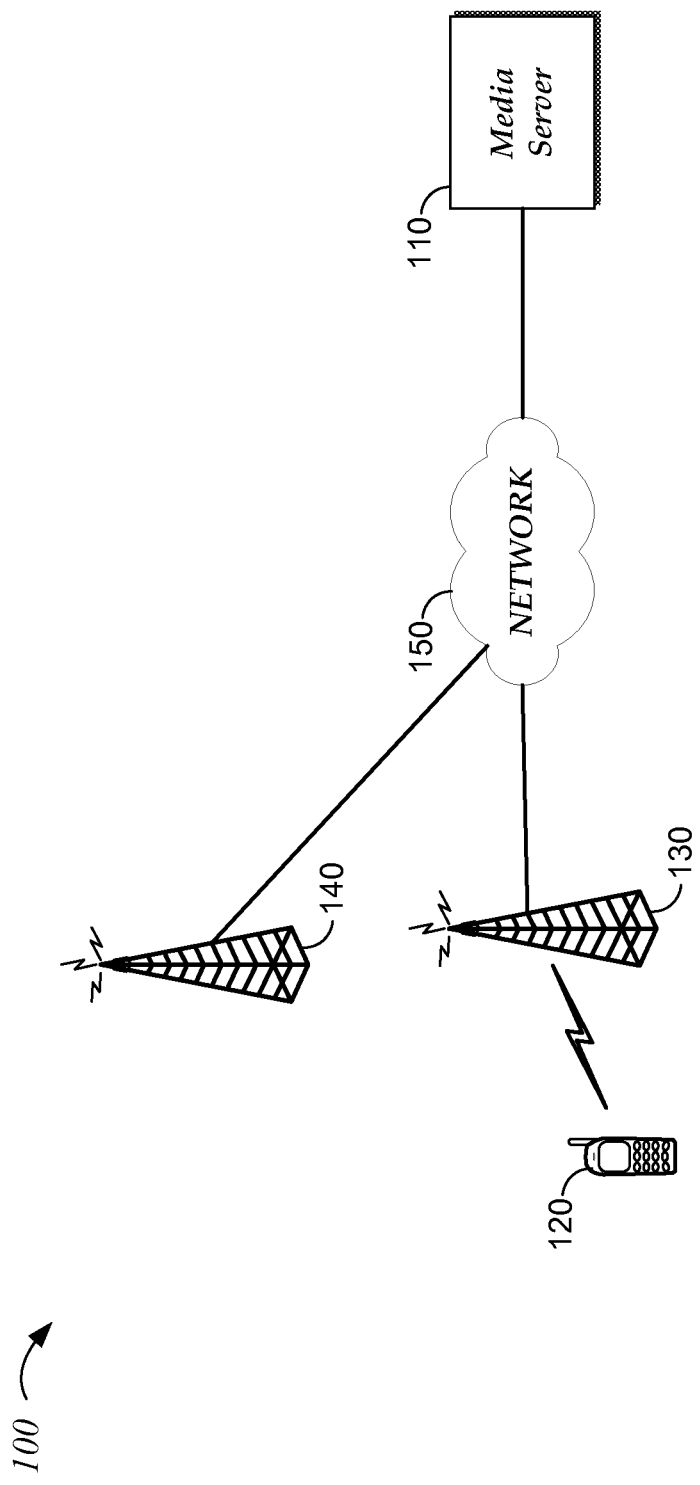
FIG. 1 illustrates an exemplary wireless multimedia streaming network.

Embodiments of the invention relate to methods and apparatuses for receiving media content on a device. In one embodiment, the device can adapt the received content based on certain conditions. Thus, adaptive media streaming can allow a mobile device to vary the quality of a multimedia stream based on certain conditions, such as network bandwidth, battery conditions, direction of travel of the device, or a variety of other conditions. Thus, in this embodiment the device can continue to provide a robust multimedia experience for a user even while parameters of the device are changing over time.

In one embodiment, the device monitors it's own parameters and then predicts future values of such parameters in order to adapt the received media content. For example, if the device detects that is accelerating to a high speed, such as when a user enters a freeway, the device may predict that based on the acceleration parameter it will continue moving to an even higher speed. Using this information, the device may request lower resolution media due to higher data errors predicted at the increased ground speed of the device.

In one embodiment, the media files are divided into segments before being transmitted from a media server or other content provider, to a user's device. In this embodiment, each segment of the media file has a particular characteristic. Exemplary characteristics include, but are not limited to: bitrate, quality, compression ratio, codec type, or number of audio tracks. The server may store a plurality of such segments for each media file so that for any particular media file, there are a plurality of media segments that can be chosen for any point in time in that media file. This allows the device to request different segments of the same file depending on the detected parameters of the user's device. Because different segments may require more or less bandwidth, or have more or less resolution, the system can determine the best quality segment to play for the user.

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM", etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

FIG. 1 illustrates an exemplary wireless multimedia streaming network 100. The wireless multimedia streaming network 100 is configured to support multimedia streaming from a media server 110 to a mobile terminal 120. The mobile terminal 120 can connect to a base station, such as base station 130 and base station 140, using a data transfer standard as discussed above. The base stations 130 and 140 are connected a network 150. The network 150 can be, for example, the Internet. Thus, the mobile terminal 120 can access the media server 110 to download multimedia content. More specifically, in one embodiment, the mobile terminal 120 can stream audio or video from the media server 110.

As the mobile terminal 120 moves within the wireless multimedia streaming network 100, the quality of its wireless link with the base station 130 can vary, and the multimedia stream from the media server 110 may be interrupted or otherwise limited. For example, the mobile terminal 120 may move into an area with greater signal attenuation. Thus, the signal-to-noise ratio (SNR) from the base station 130 may cause the data rate to drop. Similarly, the mobile terminal 120 may be moving at a high rate of speed, roaming between sectors of the base station 130 or between the base station 130 and the base station 140. The transition from the base station 130 to the base station 140 may increase latency of data packets or cause the data not to be delivered. Alternatively, congestion in the network 150 may affect delivery of the multimedia stream from the media server 110. As described herein, HTTP adaptive streaming can allow a mobile device, such as the mobile terminal 120, to vary the quality of a multimedia stream based on certain conditions, such as network bandwidth.

Figure 2:
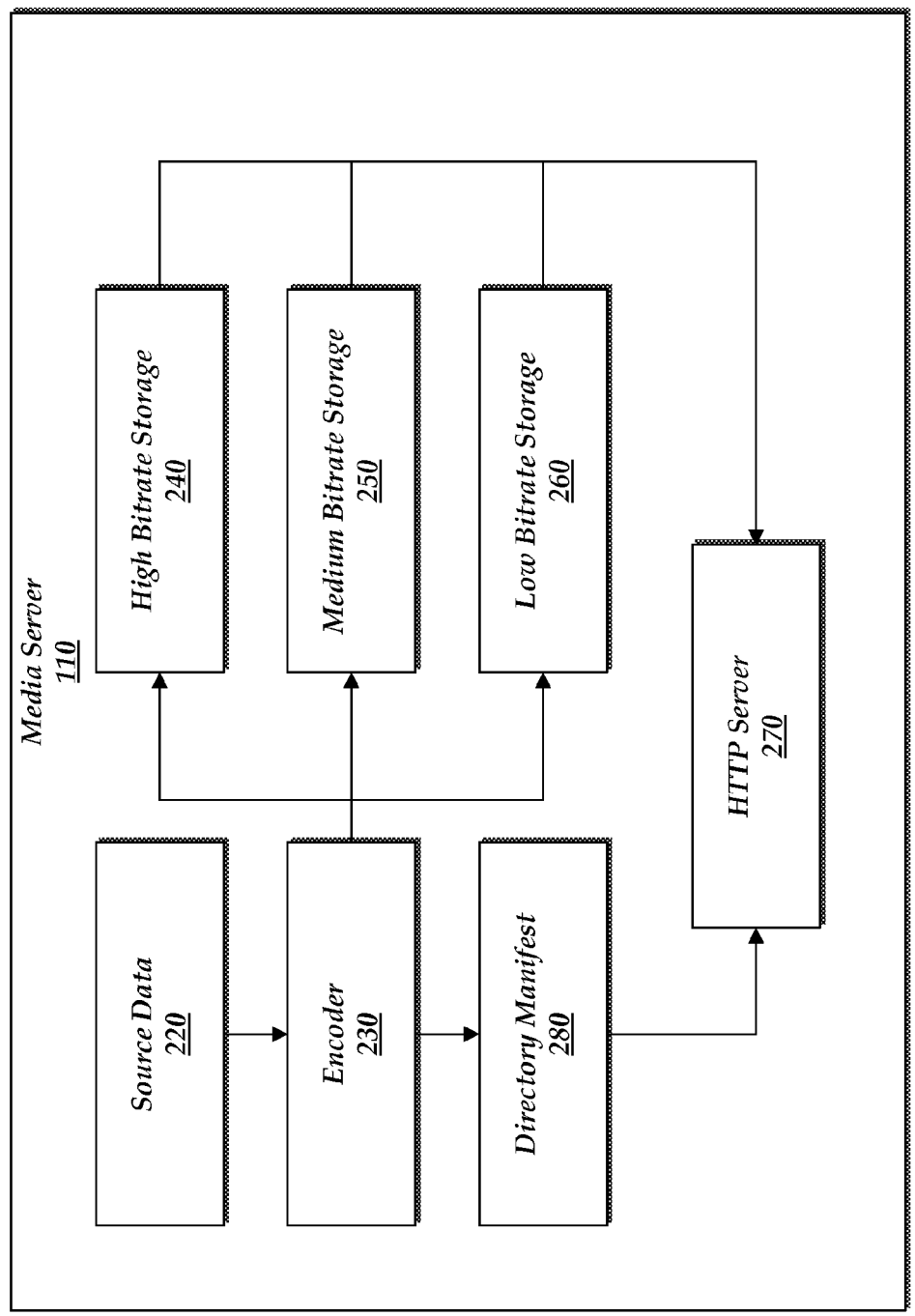
FIG. 2 illustrates an exemplary implementation of HTTP adaptive streaming on a media server, according to an embodiment.

FIG. 2 illustrates an exemplary implementation of HTTP adaptive streaming on a media server 110. The media server 110 can be a media server such as the media server 110 discussed above with respect to FIG. 1. The media server 110 encodes source data 220 with an encoder 230. Source data 220 can be high quality multimedia content, such as audio or video encoded at a high bitrate or possibly with a lossless codec. The encoder 230 can encode the source data 220 into a number of different quality levels or bitrates. In the illustrated embodiment, the encoder 230 encodes the source data 220 into a high bitrate storage 240, a medium bitrate storage 250, and a low bitrate storage 260. The encoder 230 can use a video compression technique known in the art such as, for example, MPEG-2, MPEG-4, or H.264/MPEG-4 Advanced Video Coding (AVC). The encoder 230 breaks each of the multimedia streams 240, 250, and 260 into a number of stream segments that can be accessed individually via a HTTP server 270. A directory manifest file 280 can contain a list of available stream bitrates in, for example, an HTTP accessible XML format. Thus, a terminal accessing the media server 110 can dynamically adjust the bitrate of the streaming multimedia content by requesting the appropriate stream segments as network conditions change. The stream segments can be stored for later retrieval. Furthermore, the segments can be any size such as, for example, five seconds of content. Generally, the larger the segment is, the less bandwidth will be lost to overhead such as HTTP headers and encoding overhead. However, larger segments reduce the ability of an accessing terminal to respond to changes in network conditions. In some embodiments, the encoder 230 can encode the source data 220 at multiple segment sizes for each bitrate. For example, the encoder 230 can encode the high bitrate storage 240 in both one-second and five-second segments, which can be accessed individually via the HTTP server 270 as individual Internet addresses in one embodiment.

Figure 3:
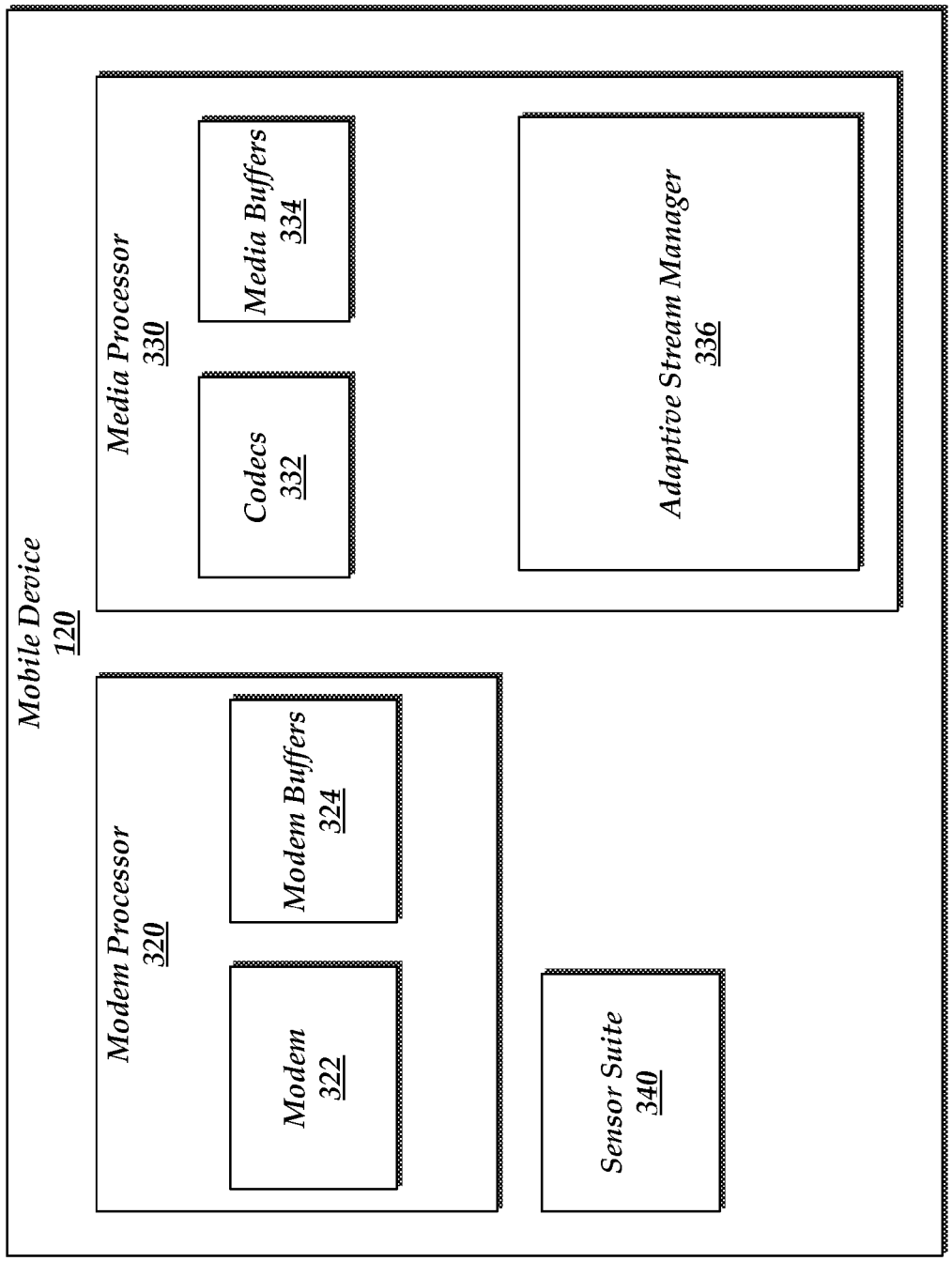
FIG. 3 illustrates an exemplary mobile terminal, according to an embodiment.

In the disclosed embodiments, an accessing terminal, such as mobile terminal 120 can choose the stream segments to download from the media server 110 based on a variety of mobile device data. Modern devices now have access to a variety of available data. FIG. 3 illustrates an exemplary mobile terminal 120 that is capable of using additional parameters to predict future bandwidth needs. In the illustrated embodiment, the mobile terminal 120 includes a modem processor 320, a media processor 330, and a sensor suite 340. The modem processor 320 serves to provide a data link through which the mobile terminal 120 can communicate with a media server such as, for example, the media server 110 discussed above with respect to FIG. 2. The modem processor 320 can be, for example, a baseband chip or module. The modem processor 320 can include a modem 322 and a modem buffer 324. The modem 322 serves to translate a radio link into data that can be understood by the modem processor 320. The modem buffer 324 serves to buffer incoming data that has not yet been processed.

The media processor 330 serves to manage an incoming multimedia stream and to prepare the stream for presentation to a user. The media processor 330 can be, for example, an application processor. The media processor 330 includes one or more codec's 332, media buffers 334, and an adaptive stream manager 336. In some embodiments, the codecs 332, the media buffers 334, and the adaptive stream manager 336 are implemented in software. The codecs 332 serve to decode the multimedia stream segments into a raw format compatible with a presentation layer. The media buffers 334 serve to create a reserve of streaming media, which can be used in case there is an interruption in data transmission.

The adaptive stream manager 336 serves to manage the multimedia stream. The adaptive stream manager 336 monitors the mobile terminal 120 and network status, including the including sensors 340, predicts future needs for multimedia stream segments, requests the appropriate segments from a media server such as media server 110 discussed above with respect to FIG. 2.

Figure 4:
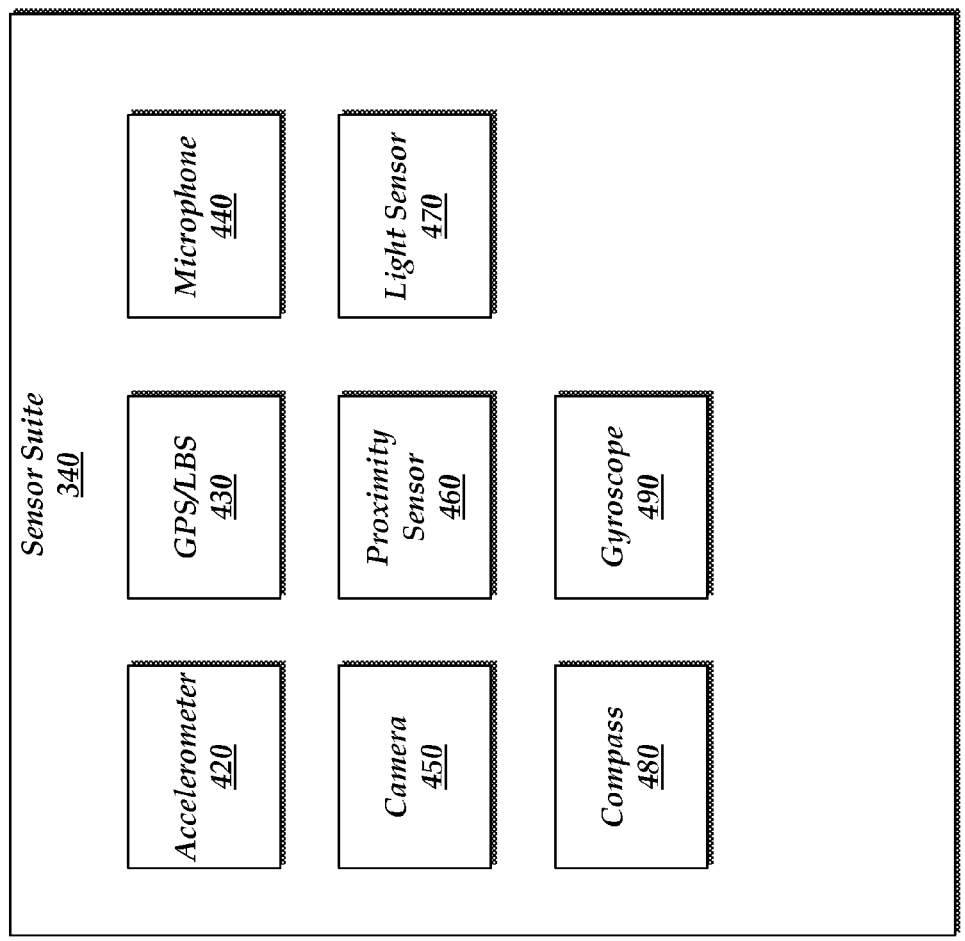
FIG. 4 illustrates an exemplary embodiment of a sensor suite of a user terminal.

FIG. 4 illustrates an exemplary embodiment of a sensor suite 340 of a user terminal such as the mobile terminal 120 described above with respect to FIG. 3. The sensor suite 340 includes an accelerometer 420, a global positioning system (GPS) or location based services (LBS) module 430, a proximity sensor 340, a microphone 440, a camera 450, a light sensor 470, a compass 480, and a gyroscope 490. The sensors 340, 420, 430, 440, 450, 460, 470, 480, and 490 can be variously integrated with other components of the mobile terminal 120 or can be individual components.

Figure 5:
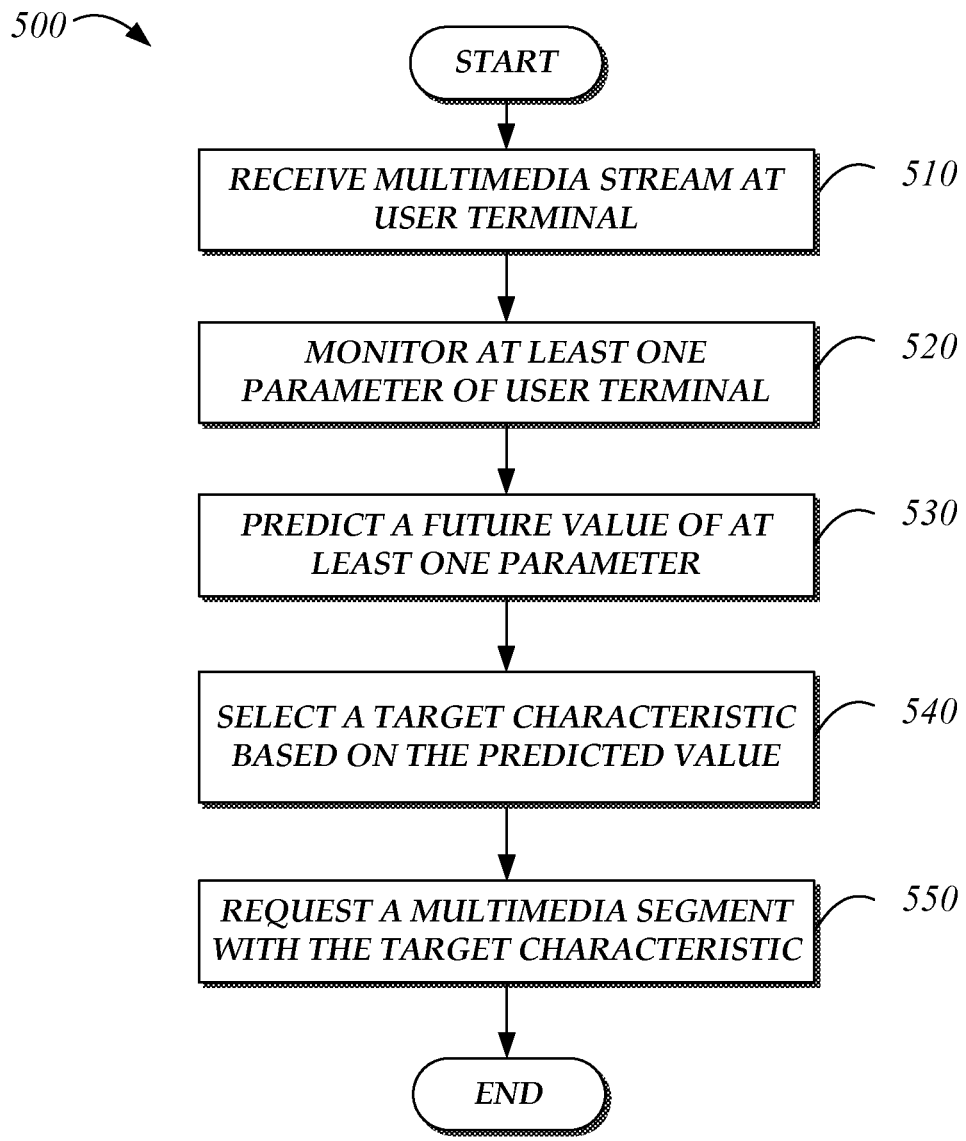
FIG. 5 illustrates an exemplary method of streaming multimedia content from a media server to a user terminal, according to an embodiment.

FIG. 5 illustrates an exemplary method 500 of streaming multimedia content from a media server to a user terminal. In one embodiment, the media server and user terminal can be media server 110 and mobile terminal 120, respectively, as discussed above with respect to FIG. 1. The method 500 can be at least partially implemented with, for example, the adaptive stream manager 336 described above with respect to FIG. 3. First, at 510, the mobile terminal 120 receives multimedia stream segments from the media server 110. Each stream segment can have multimedia characteristics that the adaptive stream manager 336 may use to determine which segment to download. Exemplary characteristics include, but are not limited to: bitrate, quality, compression ratio, codec type, number of audio tracks, etc.

Next, at 520, the adaptive stream manager 336 monitors at least one parameter of the user terminal. In various embodiments, the adaptive stream manager 336 can monitor parameters including, but not limited to: media player buffer conditions, network connection bandwidth, network connection latency, network connection type, radio signal strength, a number of IP socket data connections available, an estimated multimedia clip length, user terminal location, user terminal speed, user terminal direction, user terminal acceleration, a user requested quality level, estimated video quality, estimated sound quality, mobile terminal power consumption, remaining battery life, and/or the mobile terminal power source. In some embodiments, the media player buffer conditions correspond to the size of a buffer such as media buffer 334 discussed above with respect to FIG. 3. Media player buffer conditions can also include the rate at which the buffer is growing or being consumed. Network connection bandwidth can include wireless network bandwidth, Internet bandwidth, or the combination of the two. Network and ratio information can be obtained, for example, from the modem processor 320, and can include information such as network connection bandwidth, network connection latency, network connection type, radio signal strength, and the number of IP socket data connections available. Location information can be obtained, for example, from the GPS/LBS module 430 in the sensor suite 340 and can include such information as user terminal location, user terminal speed, user terminal direction, and user terminal acceleration.

Moving on to 530, the adaptive stream manager 336 predicts a future value of one or more of these parameters. For example, the adaptive stream manager 336 can compare current bandwidth with historical bandwidth for various time frames. Historical data may indicate that available bandwidth is likely to decrease during peak hours. Therefore, the adaptive stream manager 336 may predict that a decreasing bandwidth will continue to do so. In another example, historical data may show that a hilly area has poor reception. Therefore, the adaptive stream manager 336 may predict that signal strength is about to decline because the mobile terminal 120 is headed towards the hilly area. In yet another example, the adaptive stream manager 336 may predict that a buffer, such as the media buffer 334, will soon be full based on a current buffer fill rate. In one embodiment, as part of the prediction process, the adaptive stream manager 336 may maintain a history of monitored parameter values and correlate the historical values in order to predict future changes, as discussed below with respect to FIG. 6.

Subsequently, at 540 the adaptive stream manager 336 selects a target multimedia characteristic based on the future value of the parameter that is predicted at 530. The target multimedia characteristic can be any characteristic that helps fulfill a preset goal. For example, a user may set the adaptive stream manager 336 to prioritize continuity over quality. Alternatively, the user may set the adaptive stream manager 336 to prioritize quality, which could result in longer buffering periods or discontinuity during playback. In various other examples, a user could set the adaptive stream manager 336 to prioritize battery life, latency while seeking or fast-forwarding, audio quality, memory usage, etc. The user need not specifically set the behavior of the adaptive stream manager 336. In some embodiments, the behavior of the adaptive stream manager 336 is preset by the manufacturer or is adaptive within preset bounds. In one embodiment, the adaptive stream manager 336 selects the target multimedia characteristic, by following a hard-coded decision tree. For example, the adaptive stream manager 336 may perform a bandwidth prediction by default and target the highest resolution video that can be transported over the predicted bandwidth.

Finally, at 550, the adaptive stream manager 336 requests, from the media server 110, a multimedia segment having the target characteristic selected at 540. In order to illustrate the method 500 in further detail, a number of scenarios will for exemplary purposes only. A skilled artisan will understand that there are many variations of the method 500 within the scope of the present disclosure.

In a first example, the adaptive stream manager 336 may be set to prioritize both uninterrupted playback. The adaptive stream manager 336 may monitor bandwidth, buffer status, and GPS/LBS information. The adaptive stream manager 336 may detect that the mobile terminal 120 is accelerating at a rate that has, in the past, caused a decrease in available bandwidth. Thus, the adaptive stream manager 336 may predict that available bandwidth is about to decline. In order to keep the buffer from running empty, which would interrupt playback, the adaptive stream manager 336 may select a target characteristic of low bitrate multimedia stream segments. The adaptive stream manager 336 may then begin requesting multimedia stream segments with a sufficiently low bitrate that playback is not interrupted. The lower bitrate storage segments, however, would likely have a lower quality.

In a second example, adaptive stream manager 336 may be set to prioritize battery life. The adaptive stream manager 336 may monitor battery life, network connection type, and battery drain. If the mobile terminal 120 moves from a wireless network using a slower, lower power technology to a faster, higher power technology, the adaptive stream manager 336 may predict that battery drain will increase, and thus battery life will decrease. Accordingly, the adaptive stream manager 336 may select a target characteristic of an energy efficient codec. An energy efficient codec may be simpler and thus require less processing power to decode, allowing the media processor 330 to be throttled down to save power. However, the energy efficient codec may not produce high quality video. The adaptive stream manager 336 may then request multimedia stream segments encoded with the energy efficient codec.

In a third example, the adaptive stream manager 336 may be set to prioritize quality and battery life. The adaptive stream manager 336 may monitor battery life, GPS/LBS data, video quality, and battery drain. If the mobile terminal 120 is stationary, the adaptive stream manager 336 may be able to toggle receive diversity functionality of the mobile terminal 120 to decrease power consumption without affecting signal strength. Thus, the adaptive stream manager 336 may predict that energy consumption will decrease and quality will remain the same. The adaptive stream manager 336 may then disable receive diversity functionality. Accordingly, the adaptive stream manager 336 may then request multimedia stream segments with high quality encoding.

Figure 6:
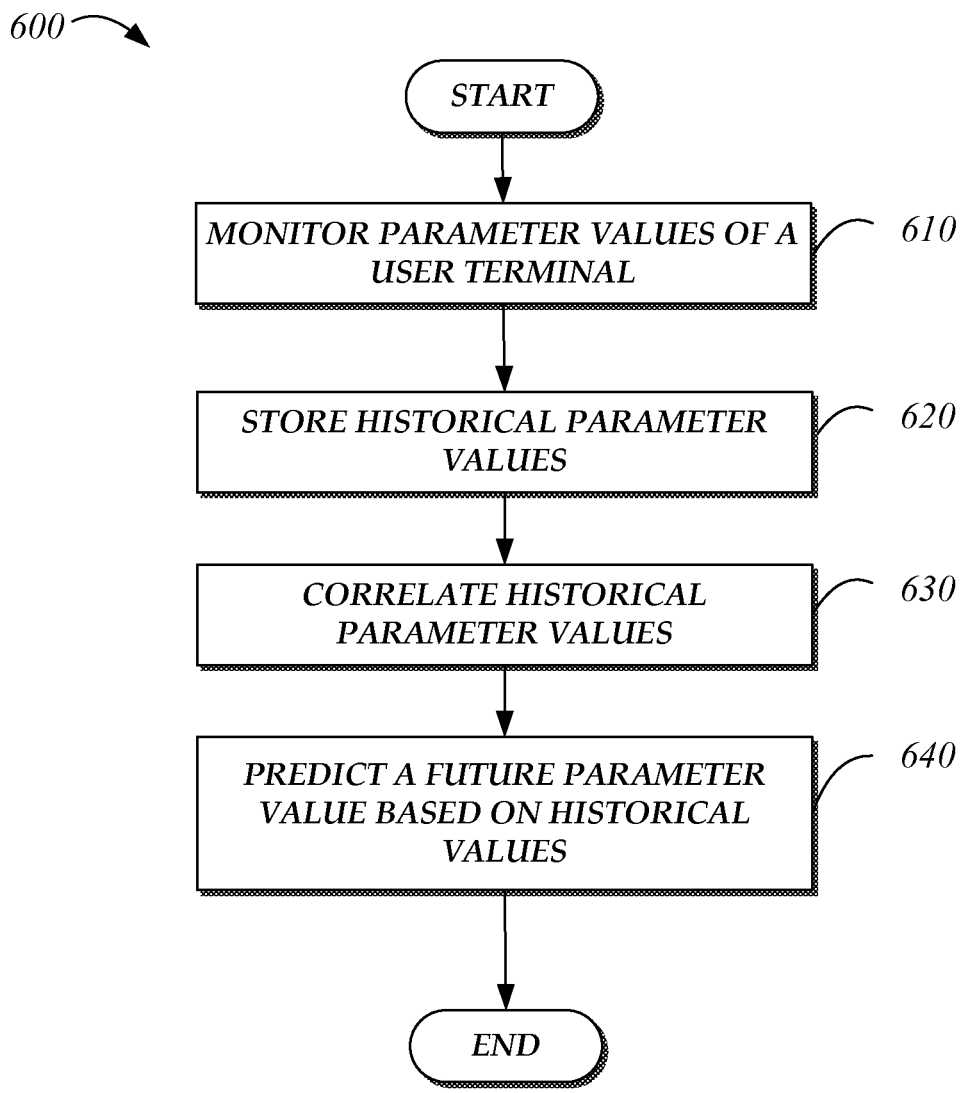
FIG. 6 illustrates an exemplary method of predicting a future value of a parameter, according to an embodiment.

FIG. 6 illustrates a method 600 of predicting future parameter values, according to one embodiment. Starting at 610, the adaptive stream manager 336 monitors parameters of a user terminal such as, for example, the mobile terminal 120. The parameters that the adaptive stream manager 336 monitors at 610 can be one of the parameters discussed above at 520, with respect to FIG. 5. Next, at 620, the adaptive stream manager 336 stores the monitored parameters as historical parameter values. In one embodiment, the historical parameter values can be stored in a memory such as, for example, a flash memory embedded in the mobile terminal 120. In another embodiment, the historical parameter values can be uploaded via a network such as the network 150. Subsequently, at 630, the historical parameter values can be analyzed and searched for patterns and correlations between the progression of one historical parameter and subsequent changes in another historical parameter. For example, analysis may show that a rising signal-to-noise ratio (SNR) is correlated with a subsequent increase in available bandwidth. At the same time, a volatile SNR pattern ending with a rise may be correlated with a subsequent decrease in available bandwidth. Historical parameter values that are uploaded to a remote server can be analyzed remotely, and a summary can be sent back to the adaptive stream manager 336. Finally, at 640, the adaptive stream manager 336 predicts a future parameter value based on the current parameter value, the historical parameter values, and the correlated patterns determined at 630.

Figure 7:
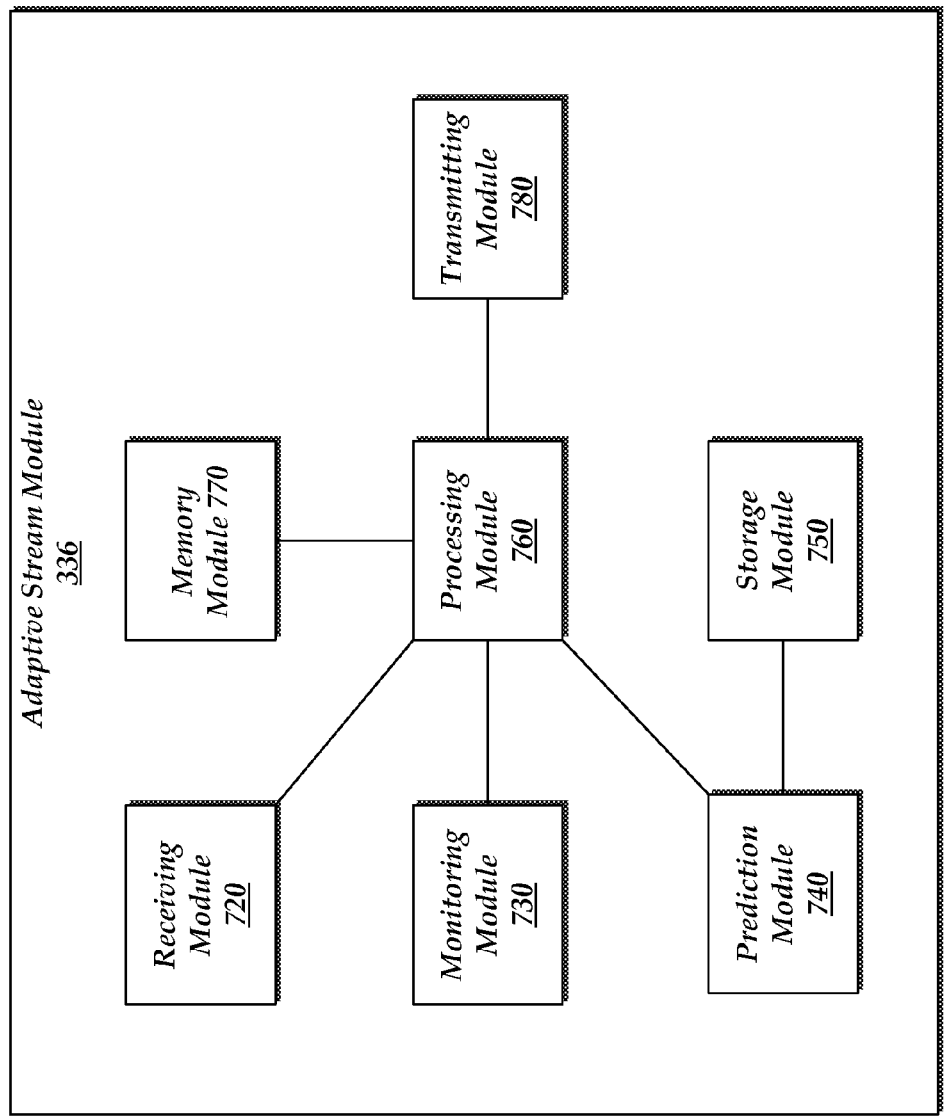
FIG. 7 illustrates an exemplary embodiment of an adaptive stream manager.

FIG. 7 illustrates an exemplary embodiment of an adaptive stream manager 336. The adaptive stream manager 336 includes a receiving module 720, a monitoring module 730, a prediction module 740, a storage module 750, a processing module 760, a memory module 770, and a transmitting module 780. The receiving module 720 serves to receive multimedia stream segments from a media server such as, for example, the media server 110 described above with respect to FIG. 1. In an embodiment, the receiving module 720 can correspond to the modem processor 320, described above with respect to FIG. 3. In another embodiment, the receiving module 720 can correspond to an aspect of the media processor 330. Thus, the receiving module 720 provides one means for receiving a multimedia stream, which can comprise a plurality of multimedia segments. The monitoring module 730 serves to monitor parameters of a user terminal such as, for example, the mobile terminal 120 described above with respect to FIG. 1. The monitoring module 730 can monitor aspects such as the sensor suite 340, the modem buffer 324, and the media buffers 334. In an embodiment, the monitoring module 720 can correspond to an aspect of the media processor 330. Thus, the monitoring module 720 provides one means for monitoring at least one parameter of the user terminal. In some embodiments, the monitored parameter is a network parameter or a quality parameter. Thus, the monitoring module 720 also provides a means for monitoring a network parameter or a network quality parameter. The prediction module 740 serves to predict a future value of at least one of the parameters monitored by the monitoring module 730. In an embodiment, the prediction module 740 can correspond to an aspect of the media processor 330. In some embodiments, the prediction module 740 correlates historical parameter data when it predicts the future parameter value. Thus, the prediction module 740 provides one means for predicting a future value of at least one parameter of the user terminal based on the historical parameter values and the recent parameter data. At the same time, the prediction module 740 can provide one means for correlating recent parameter data with the historical parameter values. Furthermore, the prediction module 740 can be configured to store historical parameter data in the storage module 750. The storage module 750 can be any data storage medium. Thus, the storage module 750 provides one means for storing historical parameter values of at least one parameter of the user terminal. The processing module 760 serves to select a target characteristic based on the future value predicted by the prediction module 740. In an embodiment, the prediction module 740 can correspond to an aspect of the media processor 330. Thus, the processing module 760 provides one means for selecting a target characteristic, based on at least one monitored parameter of the user terminal. In an embodiment, the processing module 760 provides a means for selecting the target characteristic based on the predicted future value of the at least one parameter of the user terminal. The memory module 770 serves as working memory for the processing module 760. The transmitting module 780 serves to send requests for multimedia segments to the media server 110. In an embodiment, the transmitting module 720 can correspond to the modem processor 320. In another embodiment, the transmitting module 720 can correspond to an aspect of the media processor 330. Thus, the transmitting module 780 provides one means for requesting a multimedia segment having the target characteristic.

While the above processes and methods are described above as including certain steps and are described in a particular order, it should be recognized that these processes and methods may include additional steps or may omit some of the steps described. Further, each of the steps of the processes does not necessarily need to be performed in the order it is described.

While the above description has shown, described, and pointed out novel features of the invention as applied to various embodiments, it will be understood that various omissions, substitutions, and changes in the form and details of the system or process illustrated may be made by those skilled in the art without departing from the spirit of the invention. As will be recognized, the present invention may be embodied within a form that does not provide all of the features and benefits set forth herein, as some features may be used or practiced separately from others.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

What is claimed is:

1. A method of adaptively streaming multimedia content over a network, comprising:
   receiving, at a user terminal, a multimedia stream comprising a plurality of multimedia segments, each multimedia segment having at least one multimedia characteristic;
   monitoring at least one parameter of the user terminal;
   predicting a future value of the at least one monitored parameter of the user terminal based on at least one of historical parameter values and recent parameter data;
   selecting a target multimedia characteristic based on at least one of the at least one monitored parameter, wherein selecting a target multimedia characteristic comprises selecting a target bitrate based on the at least one of the at least one monitored parameter and the predicted future value of the at least one monitored parameter of the user terminal; and
   requesting a multimedia segment having the target multimedia characteristic.

2. The method of claim 1, further comprising:
   storing the historical parameter values of the at least one monitored parameter of the user terminal; and
   correlating the recent parameter data with the historical parameter values.

3. The method of claim 1, wherein the at least one monitored parameter is based on one or more of: media player buffer conditions, network connection bandwidth, network connection latency, network connection type, radio signal strength, a number of IP socket data connections available, an estimated multimedia clip length, user terminal geospatial location, user terminal ground speed, user terminal geospatial direction, or user terminal acceleration.

4. The method of claim 1, further comprising monitoring at least one media quality parameter, wherein selecting a target multimedia characteristic comprises selecting a quality characteristic based on the at least one media quality parameter.

5. The method of claim 4, wherein the at least one media quality parameter is based on one or more of: a user requested quality level, estimated video quality, and estimated sound quality.

6. The method of claim 1, further comprising monitoring at least one power parameter, wherein selecting a target multimedia characteristic comprises selecting a target codec efficiency based on the at least one power parameter.

7. The method of claim 6, wherein the at least one power parameter is based on one or more of: mobile terminal power consumption, remaining battery life, or mobile terminal power source.

8. The method of claim 1, wherein the user terminal comprises a cellular device.

9. An apparatus capable of adaptively streaming multimedia content over a network, comprising:
   a receiver configured to receive a multimedia stream comprising a plurality of multimedia segments, each multimedia segment having at least one multimedia characteristic; and
   an adaptive stream manager configured to:
   monitor at least one parameter of the apparatus;
   predict a future value of the at least one monitored parameter of the apparatus based on at least one of a historical parameter value and recent parameter data;
   select a target multimedia characteristic based on at least one of the at least one monitored parameter and the predicted future value of the at least one monitored parameter of the apparatus; and
   request a multimedia segment having the target multimedia characteristic, wherein the adaptive stream manager is further configured to monitor at least one network parameter and to select a target bitrate based on the at least one network parameter.

10. The apparatus of claim 9, wherein the adaptive stream manager is further configured to store the historical parameter values of the at least one monitored parameter of the apparatus and to correlate the recent parameter data with the historical parameter values.

11. The apparatus of claim 9, wherein the at least one network parameter is based on one or more of: media player buffer conditions, network connection bandwidth, network connection latency, network connection type, radio signal strength, a number of IP socket data connections available, an estimated multimedia clip length, apparatus geospatial location, apparatus ground speed, apparatus geospatial direction, or apparatus acceleration.

12. The apparatus of claim 9, wherein the adaptive stream manager is further configured to monitor at least one media quality parameter and to select a quality characteristic based on the at least one media quality parameter.

13. The apparatus of claim 12, wherein the at least one media quality parameter is based on one or more of: a user requested quality level, estimated video quality, and estimated sound quality.

14. The apparatus of claim 9, wherein the adaptive stream manager is further configured to monitor at least one power parameter and to select a target codec efficiency based on the at least one power parameter.

15. The apparatus of claim 14, wherein the at least one power parameter is based on one or more of: mobile terminal power consumption, remaining battery life, or mobile terminal power source.

16. The apparatus of claim 9, wherein the apparatus comprises a cellular device.

17. An apparatus capable of adaptively streaming multimedia content over a network, comprising:
- means for receiving a multimedia stream comprising a plurality of multimedia segments, each multimedia segment having at least one multimedia characteristic;
- means for monitoring at least one parameter of the apparatus;
- means for predicting a future value of the at least one monitored parameter of the apparatus based on at least one of historical parameter values and recent parameter data;
- means for selecting a target multimedia characteristic based on at least one of the at least one monitored parameter and the predicted future value of the at least one monitored parameter of the apparatus, wherein the means for selecting a target multimedia characteristic comprises means for selecting a target bitrate based on the at least one of the at least one monitored parameter; and
- means for requesting a multimedia segment having the target multimedia characteristic.

18. A non-transitory computer readable medium comprising instructions that when executed perform a method comprising:
- receiving a multimedia stream comprising a plurality of multimedia segments, each multimedia segment having at least one multimedia characteristic;
- monitoring at least one parameter of the apparatus;
- predicting a future value of the at least one monitored parameter of the apparatus based on at least one of historical parameter values and recent parameter data;
- selecting a target multimedia characteristic based on at least one of the at least one monitored parameter and the predicted future value of the at least one monitored parameter of the apparatus, wherein selecting a target multimedia characteristic comprises selecting a target bitrate based on the at least one of the at least one monitored parameter; and
- requesting a multimedia segment having the target multimedia characteristic.

* * * * *